UNITED STATES PATENT OFFICE.

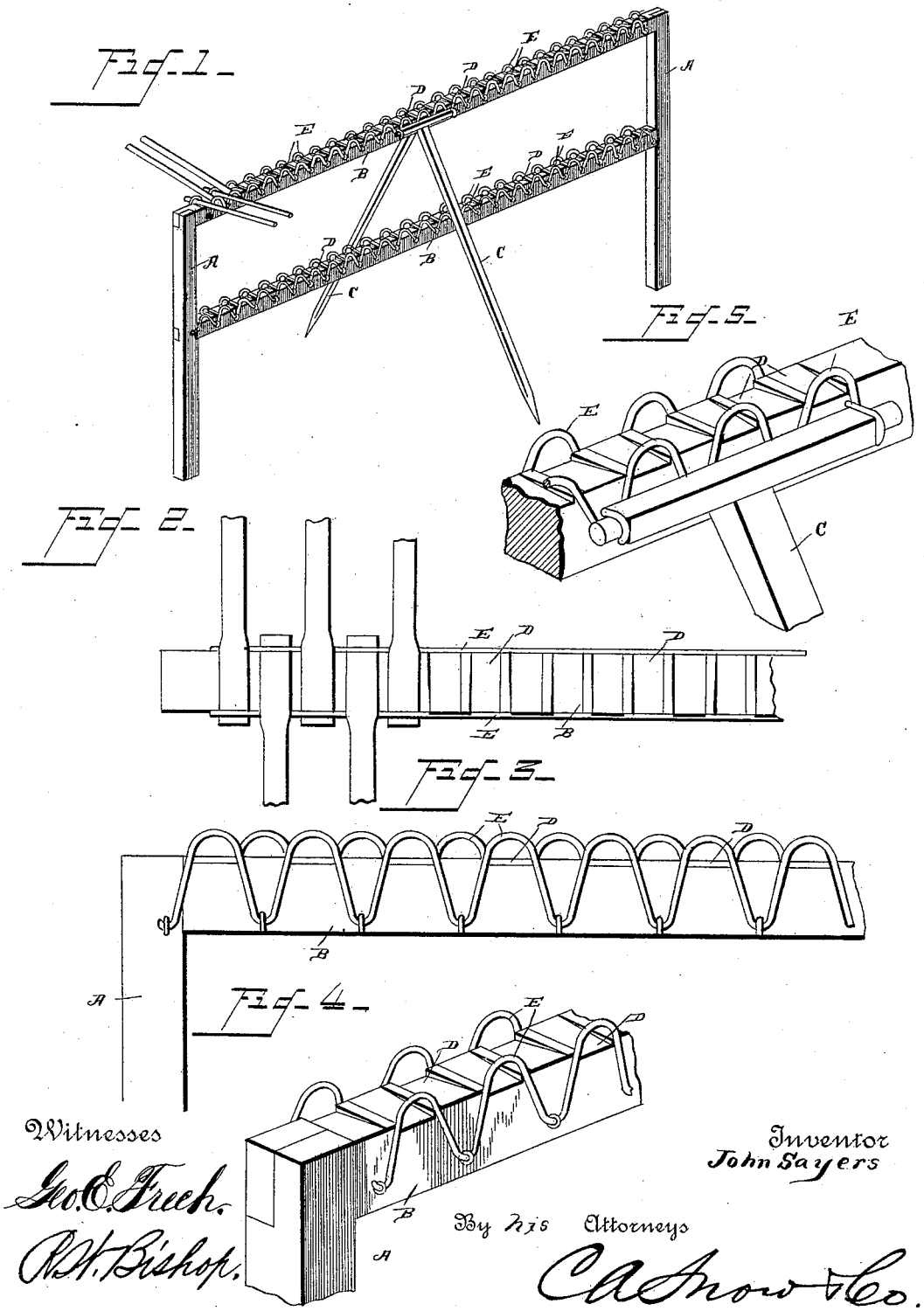

JOHN SAYERS, OF HARRODSBURG, KENTUCKY.

TOBACCO-HANGER.

SPECIFICATION forming part of Letters Patent No. 429,965, dated June 10, 1890.

Application filed October 26, 1889. Serial No. 328,237. (No model.)

*To all whom it may concern:*

Be it known that I, JOHN SAYERS, a citizen of the United States, residing at Harrodsburg, in the county of Mercer and State of Kentucky, have invented a new and useful Tobacco-Hanger, of which the following is a specification.

My invention relates to improvements in tobacco-hangers; and it consists in certain novel features hereinafter described and claimed.

In the accompanying drawings, Figure 1 is a perspective view of my improved device, showing it in its operative position. Fig. 2 is a plan view of a portion of the device on a larger scale, and Fig. 3 is a detail side view. Figs. 4 and 5 are enlarged detail perspective views.

In carrying out my invention I employ a frame consisting of the standards A A and the supporting-bars B B, and to the sides of the upper supporting-bar I hinge the braces or props C, as clearly shown. In the upper edges of the supporting-bars B, I form the recesses D, the floors of which incline downward to the sides of the supporting-bars, the floors of the adjacent recesses being inclined in opposite directions. To the sides of the supporting-bars I secure the retaining-loops E, which consist of wires having a series of reverse bends and arranged so that their upper angles or bends register with the lower ends of the recesses in the upper edges of the supporting-bars.

In practice the device is placed on the ground adjacent to the plants being cut, and is maintained in an upright position by turning the props or braces outward to the proper angle, as will be readily understood. The tobacco-sticks are secured in position by having their ends placed in the recesses in the upper edges of the supporting-bars and inserted into the bends of the retaining-loops, and are thus left projected beyond the opposite sides of the supporting-bars. As the plants are cut they are hung on the tobacco-sticks, and will thus be supported out of contact with the ground, and thereby prevented from spoiling.

From the foregoing description, taken in connection with the accompanying drawings, it will be seen that I have provided a tobacco-hanging device which is especially adapted for use in the field and to receive the plants as they are cut, so that they will not be permitted to lie on the ground. The device can also be used in dry-houses or barns, and when in use occupies but very little room and supports a large number of plants. The braces or props can be folded close to the supporting-bars when the device is not in use, so that it can be stored away in a very small space.

The alternating arrangement of the recesses and retaining-loops permits the use of a very large number of tobacco-sticks, so that a large quantity of plants may be supported by a single device, and at the same time holds the sticks out of contact with each other, so that the air can circulate freely through the plants.

Having thus described my invention, what I claim, and desire to secure by Letters Patent, is—

1. A tobacco-supporting device consisting, essentially, of the supporting-bars provided in their upper edges with recesses having their floors inclined alternately in opposite directions, and the wires secured to the sides of the supporting-bars and having a series of reverse bends registering with the said recesses, as set forth.

2. A tobacco-supporting device consisting, essentially, of the supporting-bars provided in their upper edges with recesses having their floors inclined alternately in opposite directions, and the wires secured to the sides of the supporting-bars and having a series of reverse bends registering with the lower ends of said recesses, the bends of the wire on one side being out of line with the bends on the other side, as set forth.

In testimony that I claim the foregoing as my own I have hereto affixed my signature in presence of two witnesses.

JOHN SAYERS.

Witnesses:
S. H. JONES,
P. E. BELL.